3,663,561
2-HYDROCARBYLDITHIO - 5 - MERCAPTO-1,3,4-THIADIAZOLES AND THEIR PREPARATION
Eli W. Blaha, Highland, Ind., assignor to Standard Oil Company, Chicago, Ill.
No Drawing. Continuation-in-part of application Ser. No. 643,794, May 19, 1967. This application Dec. 29, 1969, Ser. No. 888,808
Int. Cl. C07d 91/62
U.S. Cl. 260—302 SD        6 Claims

ABSTRACT OF THE DISCLOSURE

Novel and useful 2-hydrocarbyldithio-5-mercapto-1,3,4-thiadiazoles are prepared by oxidation coupling of equal molecular portions of a hydrocarbyl mercaptan and 2,5-dimercapto-1,3,4-thiadiazole or its alkali metal mercaptide. 2-hydrocarbyldithio - 5 - mercapto-1,3,4-thiadiazoles are unusual scavengers of elemental sulfur, for example one mole can deactivate 100 atoms of elemental sulfur at a temperature of about 210° F. and 25 atoms of elemental sulfur at about 300° F. The sulfur deactivation makes 2-hydrocarbyldithio-5-mercapto-1,3,4-thiadiazoles useful for preventing copper corrosion by active sulfur. Illustrative of 2-hydrocarbyldithio-5-mercapto-1,3,4-thiadiazoles are those having as the hydrocarbyl substituent alkyl, cycloalkyl, alkaryl and aralkyl groups.

RELATED APPLICATION

This application is a continuation-in-part of copending application Ser. No. 643,794, filed May 19, 1967 now abandoned.

INVENTION BACKGROUND

M. Busch and E. Zigele disclose in J. prakt. Chem. (2) vol. 60, pages 25 to 42 (1899) 2,5-dimercapto-1,3,4-thiadiazole, 2,5-bis(methylmercapto) - 1,3,4 - thiadiazole and 2,5-bis(benzylmercapto)-1,3,4-thiadiazole. United States Pat. No. 2,905,639 discloses 2-hydrocarbylthio-5-mercapto-1,3,4-thiadiazole. These compounds can be illustrated by the structural formula:

(I) 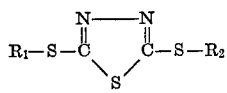

wherein $R_1$ and $R_2$ are both hydrogen as in the parent unsubstituted 2,5-dimercapto-1,3,4-thiadiazole, $R_1$ is hydrogen and $R_2$ is a hydrocarbyl substituent such as alkyl, cycloalkyl, aryl, alkaryl and aralkyl groups or both $R_1$ and $R_2$ are such hydrocarbyl groups.

In United States Pat. No. 2,719,126 there are disclosed 2,5-bis(hydrocarbyl polythio) - 1,3,4 - thiadiazoles having the formula:

(II) 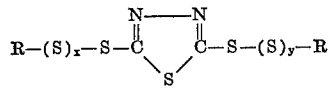

wherein $x$ and $y$ are integers from 0 to 8 and the sum of $x$ and $y$ is at least 1 and each R is alkyl, cycloalkyl, aryl, aralkyl and alkaryl hydrocarbon groups.

That patent teaches the preparation of 2,5-bis(hydrocarbyldithio)-1,3,5-thiadiazoles by the reaction of the disulfenyl chloride of 1,3,5-thiadiazole with a mercaptan.

United States Pat. No. 3,087,932 teaches the preparation of 2,5-bis(hydrocarbyldithio)-1,3,4-thiadiazoles by reacting 2,5-dimercapto-1,3,4-thiadiazole or its alkali metal salts with a hydrocarbyl mono-mercaptan and hydrogen peroxide. Although the oxidative coupling of two mercaptans:

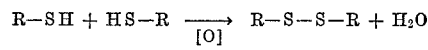

had been known, the uniqueness of the process of U.S. Pat. No. 3,087,932 lies in the production of the desired 2,5-bis(hydrocarbyldithio)-1,3,4-thiadiazole to the substantial exclusion of the co-formation of the hydrocarbyl disulfide or disulfide of 2,5-dimercapto-1,3,4-thiadiazole or combinations of mixed disulfides.

The foregoing researchers or patentees apparently were not interested in or had not conceived of the possibility of preparing 2-(hydrocarbyldithio)5-mercapto-1,3,4-thiadiazoles or had envisioned the unique properties of those compounds. The 2,5-bis(hydrocarbylthio) and 2,5-bis(hydrocarbyldithio)-1,3,4-thiadiazoles are known to have some anti-corrosion properties. They are also known to have the ability to react with limited amounts of elemental sulfur. For example, United States Pat. No. 2,719,126 teaches that 2,5-bis(hydrocarbyldithio)-1,3,4-thiadiazoles can react with elemental sulfur to produce 2,5-bis(hydrocarbyltrithio) and 2,5-bis(hydrocarbyltetrathio)-1,3,4-thiadiazoles and analagous derivatives up to a total of 18 sulfur atoms in the two substituents on the 2 and 5 ring positions of 1,3,4-thiadiazole.

However, insofar as prior knowledge is concerned the known side chain S-hydrocarbyl derivatives of 2,5-dimercapto-1,3,4-thiadiazole are somewhat limited in their ability to react with elemental or active sulfur. It is known that elemental and active sulfur cause serious metal corrosion problems. It is also known that the presence or by-product formation of elemental sulfur and active sulfur in fuels results in sulfur-containing, e.g. $SO_2$, air pollution. Thus there is a need for exceedingly efficient sulfur and active sulfur scavenging agents and anti-corrosion agents to take up the elemental and active sulfur.

SUMMARY OF THE INVENTION

I have discovered novel 2-hydrocarbyldithio-5-mercapto-1,3,4-thiadiazoles having the formula:

(III) 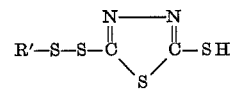

wherein R' is the hydrocarbyl substituent which is an alkyl illustrative suitably containing from 1 to 280 carbon atoms.

The 2-hydrocarbyldithio-5-mercapto-1,3,4-thiadiazoles of this invention are unique in that they can scavenge or deactivate more than 20 and up to as many as 100 atoms of elemental sulfur and active sulfur per mole. It might be expected that the number of sulfur atoms from elemental sulfur and active sulfur that can be deactivated or scavenged per mole would increase with temperature. However, this is not the case at all. Quite unobviously the number of sulfur atoms from elemental sulfur and active sulfur deactivated or scavenged per mole of 2-hydrocarbyldithio-5-mercapto-1,3,4-thiadiazole (HDMTD) increase inversely with temperature. For example, at about 210° F. one mole of HDMTD can deactivate or scavenge 100 atoms of sulfur and at 300° F. one mole of HDMTD can deactivate or scavenge 25 atoms of sulfur.

As a basis for comparison one mole 2,5-bis(t-octyldithio)-1,3,4-thiadiazole takes up four atoms of sulfur at temperatures in the range of 265° F. to 285° F. according to Examples IX and X of U.S. Pat. No. 2,719,126. Also according to this patent (Example IV) one mole of 2,5-bis-lauryldisulfide-1,3,4-thiadiazole takes up 14 equivalents of sulfur at 270° F. In contrast one mole 2-lauryldithio-5-mercapto-1,3,4-thiadiazole (a compound of this invention) can take up 100 atoms sulfur at 210° F.

I have also discovered that the HDMTD compounds of this invention can be conveniently prepared by the oxidative coupling of equimolecular portions of a hydrocarbyl mono-mercaptan of the formula R'—SH, wherein R' is a $C_1$ to $C_{280}$ alkyl group, and 2,5-dimercapto-1,3,4-thiadiazole or its alkali metal salt. A peroxy compound can be used to provide the oxidation for the oxidative coupling. A hypohalide such as sodium hypochloride, potassium hypochloride, sodium hypobromide and potassium hypobromide can be used for the oxidative coupling. Also air can be used as the source of oxygen for the oxidative coupling. The preferred source of oxygen is hydrogen peroxide and air for the oxidative coupling reaction between hydrocarbyl mono-mercaptan (R'—SH) and alkali metal salt of 2,5-dimercapto-1,3,4-thiadiazole in aqueous medium. The hypohalide oxidant is useful for the oxidative coupling reaction between hydrocarbyl mono-mercaptan and 2,5-dimercapto-1,3,4-thiadiazole in a non-aqueous medium such as in carbon tetrachloride.

The oxidative coupling is carried out at temperatures efficient for the oxidant employed. For example when hydrogen peroxide or air is the oxidant, the temperatures for the oxidative coupling reaction are desirably in the range of 150° F. to 225° F. and preferably in the range of 170° F. to 210° F.

It is preferred to conduct the oxidative coupling reaction commercially in an aqueous medium because 2,5-dimercapto-1,3,4-thiadiazole is conveniently formed as its alkali metal salt (alkali metal mercaptide) by the reaction in water between one mole hydrazine and two moles carbon disulfide in the presence of one mole alkali metal hydroxide. However, the free 2,5-dimercapto-1,3,5-thiadiazole obtained by acidification of the alkali metal mercaptide can be separately recovered and dissolved in a non-aqueous solvent, e.g. carbon tetrachloride or hydrocarbon solvent or ester solvent such as ethylacetate and the oxidative coupling reaction carried out using that solution.

Suitable hydrocarbyl mono-mercaptan (R'—SH) reactants are those whose R' hydrocarbon group corresponds to R' in the formula for the HDMTD compounds set forth before. R' can be of any size because only the mercapto group of R'—SH enters into the oxidative coupling. Thus suitable hydrocarbyl mono-mercaptans (R'—SH) include but are not limited to methyl mercaptan, ethyl mercaptan, n-propyl mercaptan, isopropyl mercaptan, n-butyl mercaptan, isobutyl mercaptan, sec. butyl mercaptan, tert. butyl mercaptan, mixed amyl mercaptans that are predominantly primary mercaptans, hexyl mercaptans, heptyl mercaptans, octyl mercaptans, decyl mercaptans, dodecyl mercaptans, cetyl mercaptans and longer chain alkyl mercaptans for example mercaptans derived from propene polymers and isobutylene polymers, especially polyisobutylenes, having 3 to about 70 propene or isobutylene units per molecule, i.e., $C_3$ to $C_{280}$ in carbon content.

The novel compounds of this invention can be readily distinguished from the closest prior 2,5-(hydrocarbyl polythio)-1,3,4-thiadiazoles (Formula II) and mixtures thereof by melting point, acidity and thin layer chromatography. The invention 2-hydrocarbyldithio-5-mercapto-1,3,4-thiadiazoles (Formula III) have distinct melting points which rules out mixtures of compounds of Formulae II and III. Since compounds of Formula III have one acidic hydrogen on the 5-mercapto group and compounds of Formula II have no acidic hydrogen, titration of the inventive compounds of Formula III dissolved in alcohol to the phenolphthalien end point to determine acidity (mg. KOH per gram of sample) would further rule out mixtures of compounds of Formulae II and III and agreement of acidity found with theoretical acidity for compounds of Formula III would establish their identity. Compounds of Formulae II and III have the same R groups and the values of $x$ and $y$ in Formula II each equal to 2 possess distinctly different $R_f$ numbers determined by thin layer chromatography.

The following examples will illustrate the preparation of compounds of this invention.

EXAMPLE 1

2-ethyldithia-5-mercapto-1,3,4-thiadiazole is prepared by adding to a solution of 90 grams (0.6 mole) 2,5-dimercapto-1,3,4-thiadiazole in 2000 parts ethylacetate, 37 grams ethyl mercaptan and 56 milliliter (0.56 mole) 30% hydrogen peroxide. The resulting mixture is stirred and heated to 150° F. in a closed system. Ethyl acetate and unreacted ethyl mercaptan are removed in vacuo. The residue is extracted with hot benzene and benzene is distilled from the extract solution leaving 2-ethyldithio-5-mercapto-1,3,4-thiadiazole.

EXAMPLE 2

A 2-hydrocarbyldithio-5-mercapto-1,3,4-thiadiazole is prepared from an 893 molecular weight mercaptan obtained from a polyisobutylene of 860 molecular weight (about 61 carbon atoms per mole). To 893 grams of that mercaptan there is added 150 grams (1.0 mole), 2,5-dimercapto-1,3,4-thiadiazole dissolved in ethylacetate. The mixture is stirred and heated to 175° F. and air is bubbled slowly into the hot mixture for four hours at a rate to provide one mole oxygen. Then the reaction mixture is heated to 200° F. at reduced pressure with a nitrogen purge to remove ethylacetate. The resulting 2-($C_{60}$ alkyldithio)-5-mercapto-1,3,4-thiadiazole is soluble in lubricant oil base stocks and has the function in lubricating oil formulations as oxidation and wear inhibiting addition agent at 0.05 to 1.0 weight percent concentration.

EXAMPLE 3

An aqueous solution of 388 grams (2.0 moles) mono-sodium salt of 2,5-dimercapto-1,3,4-thiadiazole in 425 grams water at 150° F. is acidified with 61 milliliters (1.1 moles) sulfuric acid. Then 292 grams (2.0 moles) t-octyl mercaptan are added. The resulting mixture is oxidized at a temperature starting at 170° F. and finishing at 210° F. with 225 milliliters (2.25 moles) of 30% hydrogen peroxide. The resulting aqueous reaction mixture is extracted with hot benzene. The benzene extract solution is washed with hot aqueous sodium chloride solution. The product, 2-t-octyldithio-5-mercapto-1,3,4-thiadiazole, is recovered by crystallization from the benzene solution and purified by recrystallization from hot benzene. The purified product contains 9.5% nitrogen and 43.5% sulfur by weight.

2-tertiaryoctyldithio-5-mercapto - 1,3,4 - thiadiazole is soluble in oxygenated solvents such as acetone, ethylacetate, dioxane and ethanol, is soluble in hot aromatics such as benzene, is slightly soluble in cold aromatic hydrocarbons such as benzene and toluene and cold carbon tetrachloride and is practically insoluble in saturated hydrocarbons, mineral oils of lubricating type and water. The sodium salt of 2-t-octyldithio-5-mercapto-1,3,4-thiadiazole is water soluble.

EXAMPLE 4

The preparation of Example 3 is repeated except that t-octyl mercaptan and hydrogen peroxide are added to the aqueous solution of mono-sodium salt of 2,5-dimercapto-1,3,4-thiadiazole and the oxidation is carried out at temperature starting at 170° F. and finishing at 210° F. Then the reaction mixture is acidified wth the sulfuric acid, extracted with hot benzene and the product recovered by crystallization from the brine washed hot benzene solution. The solid product of this preparation when recrystallization from benzene was the same and as pure as 2-t-octyldithio-5-mercapto-1,3,4-thiadiazole of Example 3.

The following properties were determined for the compounds of Examples 3 and 4 identified above as 2-mercapto-5-(tert.octyldithio) - 1,3,4 - thiadiazole (hereafter "MOT"), 2,5-bis-(tert.octyldithio)-1,3,4-thiadiazole (hereafter "BOT") and 2,5-dimercapto-1,3,4-thiadiazole (hereafter "DMTD"). Acidity was determined by titrating with KOH an alcohol solution to the phenolthalein end point. The values for $R_f$ were determined by thin layer chromatography on commercial silica gel plates with methylene chloride as solvent.

PHYSICAL PROPERTIES

| Compound | Melting point, °C. | Acidity (mg. KOH/g.) | | $R_f$ |
|---|---|---|---|---|
| | | Found | Calculated | |
| MOT | 111–113 | 192 | 193 | 0.385 |
| BOT | 32 | 0 | 0 | 0.655 |
| BMTD | ¹166 | 748 | 727 | 0.000 |

¹ Decomp.

The above data establish that the compounds of Examples 3 and 4 were not a mixture of MOT and BOT, or MOT and DMTD or MOT, BOT and DMTD in any proportion but rather were the named 2-mercapto-5-(tert.octyldithio)-1,3,4-thiadiazole. The above data also demonstrate that the preparative method disclosed makes the mono-substituted compounds of Formula III exclusively.

The following examples illustrate other species of compounds of Formula III in addition to compounds of Examples 1 and 2.

EXAMPLE 5

An aqueous solution of two gram moles of mono-sodium salt of 2,5-dimercapto-1,3,4-thiadiazole is acidified with sulfuric acid as described in Example 3. Then 404 grams (2.0 moles) of dodecyl mercaptan and 225 milliliters 30% hydrogen peroxide (2.25 moles $H_2O_2$) are added and the oxidation carried out at a temperature starting at 170° F. and finishing at 210° F. The aqueous reaction product is extracted with benzene (hot benzene need not be used because the product is very soluble in benzene), the benzene extract washed with hot brine and the washed benzene solution is heated to distill off the benzene. The residue is product 2-dodecyldithio-5-mercapto-1,3,5-thiadiazole. This product is a rather viscous liquid. Purified product contains 8.0% nitrogen and 36.6% sulfur by weight.

When it is not desired to recover 2-dodecyldithio-5-mercapto-1,3,4-thiadiazole from a preparation like Example 5, the aqueous reaction product mixture can be extracted with light mineral oil such as lubricating oil base stock, e.g. SAE5W oil to obtain for example a 50 weight percent concentrate of 2-dodecyldithio-5-mercapto-1,3,4-thiadiazole that can be used to formulate lubricating oil compositions.

2-Dodecyldithio-5-mercapto-1,3,4-thiadiazole and higher carbon content 2-alkyldithio-5-mercapto-1,3,4-thiadiazole homologs such as that of Example 2, are soluble in oxygenated solvents such as acetone, ethyl acetate and ethanol, aromatic and saturated hydrocarbons, mineral oils of lubricant quality and in carbon tetrachloride.

EXAMPLE 6

One mole of mono-sodium salt of 2,5-dimercapto-1,3,5-thiadiazole dissolved in water and one mole of mixed amyl mercaptans (primarily primary mercaptans) and aqueous sodium hypochloride are heated to 150° F. and oxidation is finished at 175° F. Then the aqueous reaction mixture is acidified with hydrochloric acid. The acidified aqueous mixture is extracted with hot benzene and the hot benzene extract solution is washed with hot brine. After distilling off the benzene, the residue is a mixture of 2-amyldithio-5-mercapto-1,3,4-thiadiazoles that is soluble in cold acetone, dioxane and ethanol.

The following illustrative examples will demonstrate the sulfur deactivating or scavenging properties of the compounds of this invention.

EXAMPLE 7

Decalin (decahydronaphthalene) solutions each containing 0.01 mole of 2-t-octyldithio-5-mercapto-1,3,4-thiadiazole are prepared and varying weighed amounts of sulfur are added. Duplicate solutions and amounts of sulfur are used. One set of solutions are heated with a 210° F. bath. The other set of solutions are heated with a 300° F. bath. A bright copper strip is placed in each solution heated to the test temperature. The copper test strips remain in the test solutions for three hours, are removed, washed and then compared with ASTM corrosion standards. A corrosion standard of 1b is considered as passing for the sulfur deactivation. In this manner one mole of 2-t-octyldithio-5-mercapto-1,3,4-thiadiazole is found to deactivate 100 atoms sulfur at 210° F. and 25 atoms sulfur at 300° F.

EXAMPLE 8

Testing of 2-dodecyldithio-5-mercapto-1,3,4-thiadiazole by the same sulfur corrosion test in Decalin at 210° F. and 300° F. gives the same deactivation of sulfur, 100 atoms at 210° F. and 25 at 300° F., per mole.

The 2-hydrocarbyldithio-5-mercapto-1,3,4-thiadiazoles of this invention can be added per se or as solutes in miscible solvents to lubricating oil compositions, fuel heating oils, diesel fuel oil and gasoline as sulfur and active sulfur scavenging or deactivating agents to protect copper, brass and silver metal parts from sulfur corrosion and to provide anti-oxidation and anti-wear functions. For these uses corrosion inhibiting amounts, e.g. from about 0.01% to 10% by weight, of the 2-hydrocarbylidithio-5-mercapto-1,3,4-thiadiazoles are suitable.

A novel dual utilization of the lubricating oil soluble 2-hydrocarbyldithio-5-mercapto-1,3,4-thiadiazole compounds of this invention can be practiced as follows. A 50% by weight concentrate of 2-dodecyldithio-5-mercapto-1,3,4-thiadiazole or the 2-($C_{60}$ alkyldithio)-5-mercapto-3,4-thiadiazole solution in SAE 5W oil is first used at 210° C. to scavenge sulfur or active sulfur from a hydrocarbon boiling below 210° F. The sulfur or active sulfur contaminated hydrocarbon can be introduced into the solution in the liquid or vapor phase. When the sulfur or active sulfur scavenging capacity of the solution is reached the sulfur or active sulfur contaminated stream is switched to a second fresh solution. The first solution can be used as a highly sulfurized component of a cutting oil or of a grease together with fresh oil and thickening agents. Such cutting oils and greases can be used where extreme pressure lubricant service is required.

I claim:

1. A 2-hydrocarbyldithio-5-mercaptothiadiazole having the formula:

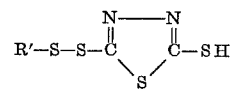

in which the substituent R' is an alkyl having a carbon atom content of from 1 to 280 carbon atoms.

2. The compound of claim 1 wherein R' is the t-octyl group.

3. The compound of claim 1 wherein R' is the dodecyl group.

4. The compound of claim 1 wherein R' is the mixture of predominantly primary amyl groups.

5. The compound of claim 1 wherein R' is the polyisobutylene group having a molecular weight of 860.

6. A method of preparing 2-hydrocarbyldithio-5-mercapto-1,3,4-thiadiazoles of the formula:

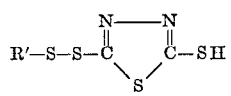

in which R' is an alkyl group having a carbon atom content of from 1 to 280 carbon atoms the mercaptan R'—SH whose R' group is the same as above defined and 2,5-dimercapto-1,3,4-thiadiazole or its alkali metal salt in a mole ratio of 1 to 1 wherein said oxidative coupling is accomplished with hydrogen peroxide or with air at a temperature in the range of 150–225° F.

References Cited
UNITED STATES PATENTS 3,087,932    4/1963    Little _____ 260—302

ALEX MAZEL, Primary Examiner

R. J. GALLAGHER, Assistant Examiner

U.S. Cl. X.R.

44—63; 252—47

PO-1050
(5/69)

UNITED STATES PATENT OFFICE
CERTIFICATE OF CORRECTION

Patent No. 3,663,561                           Dated   May 16, 1972

Inventor(s)  Eli W. Blaha

It is certified that error appears in the above-identified patent and that said Letters Patent are hereby corrected as shown below:

Column 4, line 64:  "out at temperature" should read -- out at <u>a</u> temperature --

Column 5, table:  "BMTD" should read -- DMTD --

Column 6, line 42:  "following mercapto-3,4-"  -- 1, -- should precede "3,"

Signed and sealed this 22nd day of August 1972.

(SEAL)
Attest:

EDWARD M. FLETCHER, JR.                     ROBERT GOTTSCHALK
Attesting Officer                           Commissioner of Patents

Disclaimer 3,663,561.—*Eli W. Blaha*, Highland, Ind. 2-HYDROCARBYLDITHIO-5-MERCAPTO-1,3,4-THIADIAZOLES AND THEIR PREPARATION. Patent dated May 16, 1972. Disclaimer filed Oct. 27, 1980, by the assignee, *Standard Oil Company*.

Hereby enters this disclaimer to all claims of said patent.

[*Official Gazette February 10, 1981.*]